United States Patent [19]

Stahel

[11] Patent Number: 4,615,556
[45] Date of Patent: Oct. 7, 1986

[54] WINDSHIELD VENT WING AND HINGE

[75] Inventor: Alwin J. Stahel, St. Paul, Minn.

[73] Assignee: Drag Specialties, Inc., Minnetonka, Minn.

[21] Appl. No.: 701,785

[22] Filed: Feb. 14, 1985

[51] Int. Cl.⁴ .............................................. B62J 17/04
[52] U.S. Cl. ............................... 296/78.1; 280/289 S
[58] Field of Search .................. 296/78.1, 78 R, 84 C; 280/289 H, 289 S; 98/2.19

[56] References Cited

U.S. PATENT DOCUMENTS

| D. 245,904 | 9/1977 | Vetter | D12/11 |
| 2,555,146 | 5/1951 | McNamee | 296/84 C |
| 4,082,345 | 4/1978 | Willey | 296/78.1 |
| 4,087,110 | 5/1978 | Vetter | 296/78.1 |
| 4,089,556 | 5/1978 | Stober | 296/78.1 |

FOREIGN PATENT DOCUMENTS 515141  5/1920  France .

Primary Examiner—Robert R. Song
Attorney, Agent, or Firm—Faegre & Benson

[57] ABSTRACT

A motorcycle windshield with adjustable built-in wing vents for varying the ventilation to the motorcycle rider which utilizes a constant torque hinge to support the top and bottom edges of the vent wings. The hinge utilizes Belleville washers as a combined spring and bearing.

2 Claims, 4 Drawing Figures

U.S. Patent   Oct. 7, 1986   4,615,556
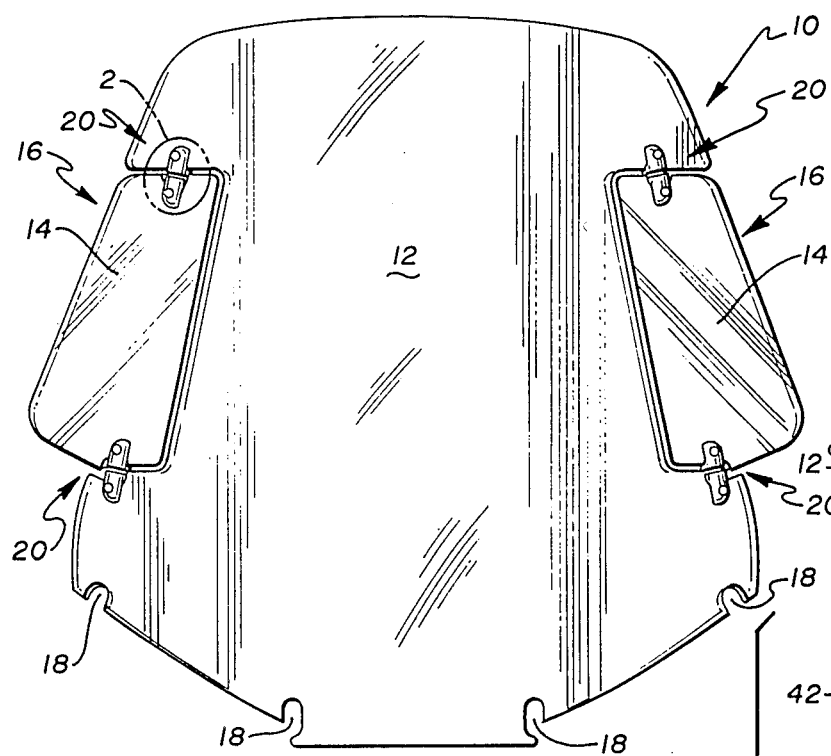
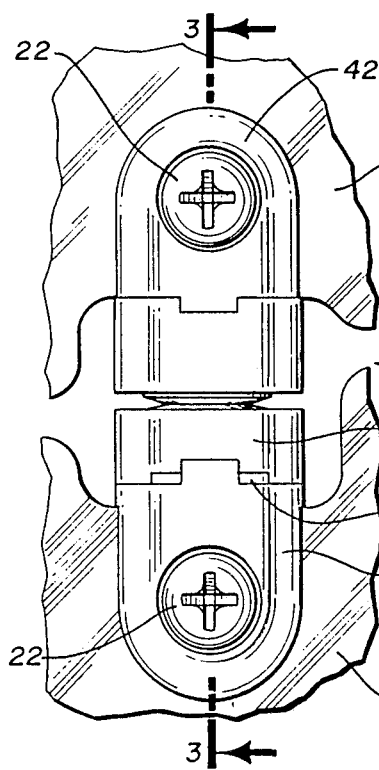
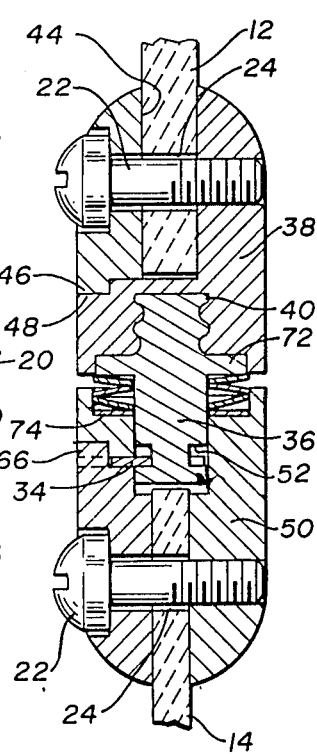
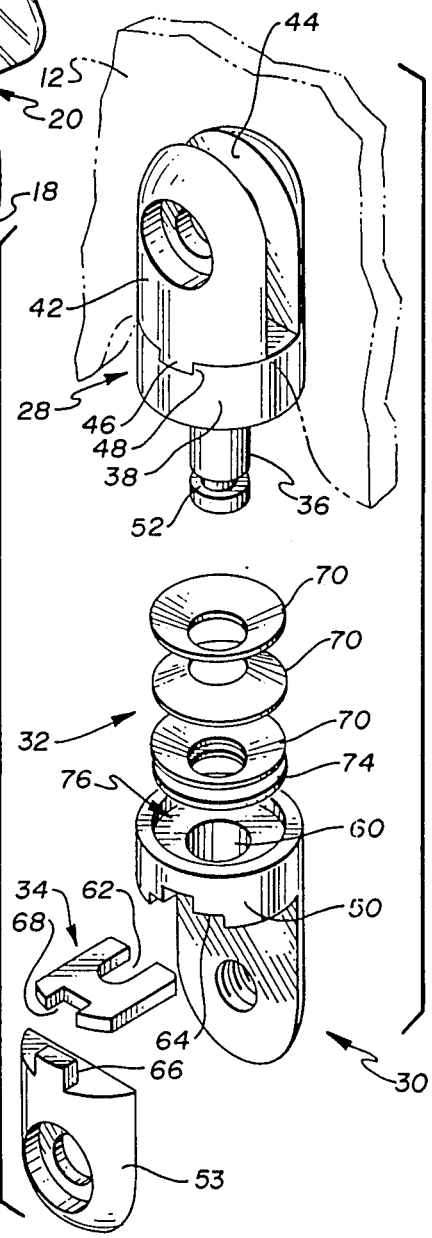

4,615,556

WINDSHIELD VENT WING AND HINGE

BACKGROUND OF THE INVENTION

Over the years, a number of various types of windshields have been developed for the convenience, comfort and safety of motorcycle riders. The windshields are either mounted directly on the motorcycle handlebars or form the top portion of a more complex fairing assembly, such as the one shown in U.S. Design Pat. No. 245,904 (to Fetter). The windshields are all designed to deflect the airstream from the rider and even the passenger's face as the motorcycle is ridden.

Because motorcycles are ridden in a variety of weather conditions, it is not always desirable to deflect all of the air around the driver. Particularly in very hot weather, it is desirable and necessary to adjust the amount of ventilating air which reaches him and his passenger. Accordingly, various vent wings have been developed and sold. To date, all of the vent wings are "add-on" devices which clamp to the edge of an existing wind screen and which utilize hinges oriented basically in a horizontal plane and engage the edge of the vent or wind screen which is aligned with the edge of the windshield to which it is to be hinged. U.S. Pat. No. 4,089,556 shows hinged side vent wings which are movable relative to the main windshield to allow the handlebars to be moved without interference with the handlebars.

The addition of add-on vents to existing windshields has not always been successful. The prior art mechanical hinges are susceptible to wear and often exhibit a marked loosening as they are used. This results in loose vents which can be unsatisfactory because they do not remain in the position in which the driver adjusts them. Also, because the vents are hinged along an edge rather than on the top and bottom of the vent, they are typically added only to the outside edge of an existing windshield and, therefore, may not provide a sufficient adjustment of the air flow reaching the driver without radically altering the flow pattern of the air across the windshield and inducing severe turbulent flow to deflect at least some air to the face of a driver positioned in the shelter of a windshield which partially wraps around his face.

SUMMARY OF THE INVENTION

In order to overcome the deficiencies of prior art windshield vents, I have developed a new windshield vent which is pivotally mounted by its top and bottom edges within the overall outline of a motorcycle windshield and utilizes vertically oriented hinges about which the vent may be pivoted to provide ready operator adjustment.

Specially designed hinges which have controlled wear characteristics provide a long-wearing, constant torque, adjusting hinge for the vent which can be reaily adjusted by the motorcycle rider and which holds its position against buffeting wind forces and vibration for long periods.

BRIEF DESCRIPTION OF THE DRAWINGS

FIG. 1 is front view of the motorcycle windshield and inset vents;

FIG. 2 is a front view of one of the vent hinges shown in detail and greatly enlarged and taken from the point designated at 2 in FIG. 1;

FIG. 3 is a sectional side view taken along the line 3—3 of FIG. 2; and

FIG. 4 is an exploded pictorial view of some of the elements of the hinge of FIG. 3.

DETAILED DESCRIPTION OF THE PREFERRED EMBODIMENTS

A vented motorcycle windshield 10 is shown in the front view in FIG. 1. The windshield includes a central wind screen 12 and at least one vent wing 14 mounted within a vent portion 16 set into the perimeter of wind screen 12. Wind screen 12 has mounting holes 18 adapted for mounting the wind screen on a motorcycle by connecting it to a suitable motorcycle fairing such as shown in U.S. Pat. No. 4,087,110 or by connecting it more or less directly to the motorcycle frame or handlebars as shown, for example, in U.S. Pat. No. 4,082,345. Vent links 14 are mounted in vent portions 16 using hinges 20.

The details of the hinges 20 are shown in FIGS. 2–4. FIG. 2 is a greatly enlarged detail of one of the hinges 20 and is shown connecting wind screen 12 and vent wing 14. Hinge 20 is attached to the plexiglass, lexan or other plastic wind screen and vent wing sheet material using suitable connectors, such as screws 22, to connect the hinge body to the sheet material through suitably drilled holes 24.

Hinge 20 is made up of a number of individual parts. It includes an upper subassembly generatlly designated 28, a lower subassembly generally designated 30, bearings, designated 32 and a keeper designated 34, as shown in the exploded diagram in FIG. 4.

The male hinge subassembly 28 is comprised of a shaft portion 36 machined from a strong corrosion-resistant material, such as 301 series stainless steel. Shaft 36 is molded into a male pivot piece 38 and is retained in piece 38 by one or more radial protrusions 40 which securely anchor shaft 36 in male pivot 38. Male pivot 38 is formed from a suitable polycarbonate or plastic material. A 20% glass-filled polycarbonate, known as Lexan 3412, has been used in the preferred embodiment of the hinge as shown. A stop portion 42 mates with male pivot 38 to form a slot 44 which has a width suitable to engage the edge of wind screen 12. A tab 46 on stop 42 engages a cooperative notch 48 on the top surface of pivot 38.

When male hinge subassembly 28 is attached to wind screen 12, bolt 22 passes through hole 24 and is screwed into threads molded in male pivot 38 to secure the windshield stop 42 against wind screen 12 and pivot 38 to form a solid hinge subassembly 28 which forms a clevis engaging both sides of slot 44 to receive wind screen 12. Bolt 22 passes through both sides of the clevis.

Female pivot portion 50 and stop portion 52, as well as stop portion 42, are all formed from the same material as male pivot 38. As can best be seen in FIG. 4, female pivot 50 and stop 52 can be fitted together to form a female hinge subassembly 30 which engages vent 14 in the space between stop 52 and pivot 50.

Hinge 20 is assembled as shown in FIG. 3. Shaft 36 which is permanently molded into male pivot 38 projects through opening 60 in the top of female pivot 50. An annular groove 52 on shaft 36 is pushed through opening 60 to expose groove 52 which is engaged by slot 62 of keeper 34. Keeper 34 fits a molded slot 64 on pivot 50 as shown. When keeper 34 is inserted and engages slot 52 in shaft 36, it keeps hinge subassembly 28 from being axially moved relative to female hinge subassembly 30 while allowing relative rotational movement between the two subassemblies about the axis of shaft 36.

Keeper 34 is retained in position against shaft 36 by stop 53, the projecting tab 66 of which fits into a cooperating slot 68 on the other side of keeper 34 from slot 62.

In order to provide a repeatable and fixed resistance torque to inhibit movement of one hinge subassembly part relative to the other, an axial force is applied to the two hinge subassemblies 28 and 30 along the axis of shaft 36 by using a spring loaded bearing 32 as shown. In the preferred embodiment shown, spring bearing 32 is formed from a series of Belleville washers 70 which are compressed at the time that the hinge is assembled to 80-90% of their travel. The Belleville washer spring bears upon an annular flange 72 of shaft 36 and upon a thrust washer 74 which is mounted in the recess 76 in the upper portion of female pivot 50. Thus, the movement of one subassembly relative to the other is restrained by the friction of the spring loaded junction of the top and bottom Belleville washers 70 against flange 72 of shaft 36 and stainless steel thrust washer 74. Even as the bearing surface wears, the force provided by the Belleville spring 32 remains constant and the torque required to rotate bearing subassembly 28 relative to subassembly 30 remains relatively constant over the life of the hinge.

It will be seen that the use of the hinge shown to mount a vent wing in a motorcycle wind screen is just one of the many uses which the new hinge facilitates. It will also be seen that various changes can be made to the hinge structure itself without departing from the spirit of my invention which is limited only by the appended claims.

What is claimed is:

1. A windshield for providing adjustable ventilation for a motorcycle rider comprising, in combination:
   (a) a windscreen having a base portion thereof adapted for mounting on a motorcycle, the windscreen constructed and arranged for screening a rider positioned behind it from air flow due to motion of the motorcycle, the windscreen having at least one vent portion cut into its perimeter, the vent portion having top and bottom edges and a side edge;
   (b) at least one vent wing having top and bottom edges and an inside edge, the vent wing constructed and arranged for mounting in the vent portion of the windscreen to block the flow of air through the vent portion; and
   (c) hinge means mounted on the top and bottom edges of the vent wing and displaced from the inside edge of the vent wing and connected to the respective top and bottom edges of the windscreen vent portion above and below the vent portion, the rotary hinge means constructed and arranged for permitting rotation of the vent wing about an axis parallel to the surface of the windscreen, thereby altering the air flow over the windscreen and adjusting the amount of ventilation provided to a rider positioned behind the windscreen.

2. The invention of claim 1 wherein each rotary hinge means comprises:
   upper and lower hinge subassembly means constructed and arranged for attachment to an edge of the vent portion of the windscreen and to an edge of the vent wing, one of the hinge subassembly means including a protruding male portion and the other including a female portion constructed and arranged for receiving the male portion;
   bearing means mounted on the male portion between the upper and lower subassemblies; and
   keeper means for insertion into one of the subassemblies for engaging and securing the male portion of the other subassembly inserted therein and forming a rotary hinge rotatable about an axis through the male portion.

* * * * *